United States Patent

[11] 3,631,336

[72] Inventor William H. Marvin
Winston-Salem, N.C.
[21] Appl. No. 887,146
[22] Filed Dec. 22, 1969
[45] Patented Dec. 28, 1971
[73] Assignee Western Electric Company, Incorporated
New York, N.Y.

[54] CIRCUIT FOR DETERMINING DEVIATION FROM RESONANCE OF LC NETWORKS BY CANCELLING INPHASE COMPONENT AND SENSING QUADRATURE COMPONENT
6 Claims, 2 Drawing Figs.

[52] U.S. Cl. .................................................. 324/57 R
[51] Int. Cl. .................................................. G01r27/00
[50] Field of Search ............................................ 324/57

[56] References Cited
UNITED STATES PATENTS
2,759,146 8/1956 Heinz ........................... 324/57

*Primary Examiner*—Edward E. Kubasiewicz
*Attorneys*—W. M. Kain, R. P. Miller and B. I. Levine ABSTRACT: A circuit for measuring the deviation of resonance of a series LC circuit includes an operational amplifier with the series LC circuit connected in a feedback path. The amplifier output is connected to both an inphase discriminator and a quadrature discriminator. The output of the inphase discriminator controls an inverted inphase circuit to cancel out a substantial portion of the inphase component of the amplifier output which is applied to the quadrature discriminator. A circuit for measuring the deviation from resonance of a parallel resonance LC circuit includes a transformer with one side of the secondary connected in series with the operational amplifier and the LC circuit and with the opposite side of the transformer connected by a radiant energy controlled resistor to the input of the amplifier. The radiant energy controlled resistor is controlled by a lamp operated by an inphase discriminator to cancel a substantial portion of the inphase component of the signal through the parallel resonant circuit.

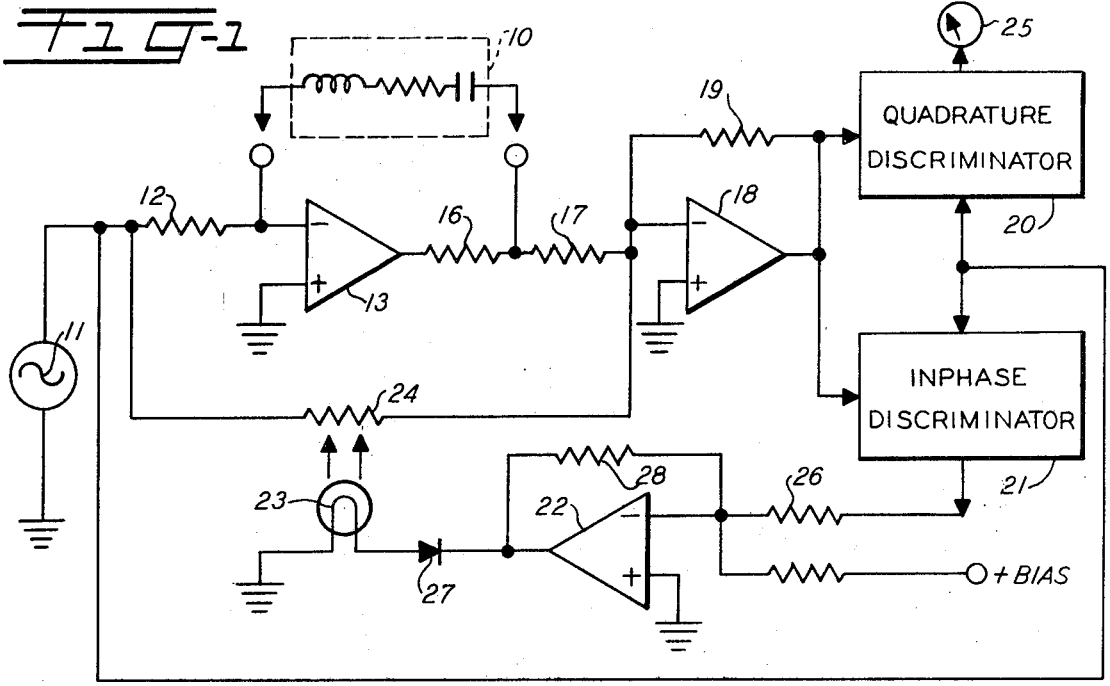

3,631,336

CIRCUIT FOR DETERMINING DEVIATION FROM RESONANCE OF LC NETWORKS BY CANCELLING INPHASE COMPONENT AND SENSING QUADRATURE COMPONENT

BACKGROUND OF THE INVENTION

1. Field of the Invention

Resonant LC circuits are manufactured for use in a variety of electrical circuits and systems. It is desirable to test the resonant frequency of the circuits to determine their deviation from an optimum resonant frequency.

2. Prior Art

A variety of test circuits have been used in the prior art to determine the resonant frequency of an LC network or the deviation of the resonant frequency from a desired frequency. The prior art circuits are characterized in that they generally require slow manual operating techniques or produce relatively inaccurate readings.

SUMMARY OF THE INVENTION

An object of the present invention is a circuit for determining the deviation of the resonant frequency of an LC network from a desired resonant frequency.

In accordance with this and other objects, an embodiment of the invention utilizes a current through the network to produce an intermediate voltage having inphase and quadrature components proportional to inphase and quadrature components of the impedance of the network. A first phase-discriminating circuit senses the inphase component of the intermediate voltage and controls an inverted inphase current to cancel a substantial portion of the inphase component of the intermediate voltage applied to a second phase discriminating circuit sensing the quadrature component of the intermediate voltage. The second phase-discriminating circuit produces an output voltage indicative of the deviation of the resonant frequency from the desired resonant frequency.

In an alternative embodiment, a parallel resonant LC network is connected to the input of an intermediate voltage producing circuit along with an inverted inphase current producing circuit. The inverted inphase current producing circuit is controlled by the inphase component of the intermediate voltage to cancel a substantial portion of the inphase component thereof.

BRIEF DESCRIPTION OF THE DRAWING

FIG. 1 is an electrical diagram of a circuit for measuring the deviation of an unknown resonant frequency of a series LC network from a desired resonant frequency; and FIG. 2 is an electrical diagram of a circuit for determining the deviation of an unknown resonant frequency of a parallel LC network from a desired resonant frequency.

DETAILED DESCRIPTION

Referring first to FIG. 1, there is shown a series LC network 10 which has an unknown resonant frequency. A source 11 producing an AC signal having the frequency of desired resonance for the LC network 10 is connected by resistor 12 to the input of a high gain operational amplifier 13. The output of the amplifier 13 is connected by a pair of serially connected resistors 16 and 17 to the input of a second operational amplifier 18. The network 10 is connected across the junction of the resistors 16 and 17 and the input of the amplifier 13 to provide a feedback path for the amplifier 13. The output voltage of the amplifier 13 has a quadrature component having a magnitude dependent upon the deviation of resonant frequency of the network 10 from the frequency of the source 11. Also, the output of the amplifier 13 has a large inphase component which will be many times larger than the quadrature component when the network 10 has a resonant frequency close to the frequency of the source 11.

The output of the amplifier 18 is applied to the input of a quadrature discriminator 20 and an inphase discriminator 21 which have a reference signal applied thereto from the source 11. The gain of the amplifier 18 is controlled by the feedback resistor 19. The output of the inphase discriminator 21 is applied through a resistor 26, a third operational amplifier 22 and a diode 27 to an incandescent lamp 23 which illuminates a radiant energy controlled resistor 24 connected between the source 11 and the input of the amplifier 18. The gain of the amplifier 22 is determined by a feedback resistor 28. A meter 25 indicates the magnitude of the quadrature component of the voltage applied to the input of the quadrature discriminator 20. If the resonant frequency of the network 10 is exactly equal to the source 11, no quadrature component is present and the meter 25 indicates zero deviation in resonant frequency. When the resonant frequency of the network 10 differs from the frequency of the source 11, a quadrature component is present and a deviation is indicated by the meter 25.

In practical quadrature discriminators, the presence of a large inphase signal produces an error in the output signal of the quadrature discriminator. To prevent this error, the inphase component of the signal of the output of the amplifier 18 is detected by the discriminator 21 and applied by the amplifier 22 to the lamp 23 and the radiant energy controlled resistor 24 to apply an inverted inphase signal (inverted relative to the inphase component on the output of the amplifier 13) to the input of the amplifier 18 to cancel out a substantial portion of the inphase component of the output signal of the amplifier 13 when applied to the input of the amplifier 18. Thus, the error produced in the readout of the quadrature discriminator 20 due to the presence of a large inphase component is greatly reduced.

The output of the quadrature discriminator 20 represents the resultant reactive impedance of the network 10. The deviation of the resonant frequency differs from the resultant reactive impedance of the network 10. However, in a practical situation the approximate impedance of the L and C components of the network 10 are known and a scale can be devised for the meter 25 which reads the deviation of the resonant frequency with a high degree of accuracy. For example, if the individual reactive impedances of the LC network 10 vary individually by 2 percent from a nominal value, the error in hertz deviation from resonant frequency indicated by the readout of the meter 25 is less than 2 percent of the actual hertz deviation from resonant frequency which is greater than the accuracy of most conventional testing circuits.

Referring to FIG. 2, there is shown a circuit for testing the deviation of the unknown resonant frequency of a parallel network 30 from the frequency of a source 31. The signal from the source 31 is applied by a one side of a secondary winding of a transformer 32 through the network 30 to the input of an operational amplifier 33. The other side of the secondary of the transformer 32 is connected by a radiant energy controlled resistance 34 to the input of the operational amplifier 33. The output of the operational amplifier 33 is applied to the input of a quadrature discriminator 36 and an inphase discriminator 37. The signal from the source 31 is applied as a reference signal to the quadrature discriminator 36 and the inphase discriminator 37. The output of the inphase discriminator 37 is applied by an operational amplifier 38 to an incandescent lamp 39 which illuminates the radiant energy controlled resistance 34. Feedback resistors 41 and 42 determine the gain of the respective amplifiers 33 and 38.

In operation, a substantial portion of the inphase component of the current through the network 30 is cancelled at the input of the amplifier 33 by the feedback from the inphase discriminator 37 which controls the conductivity of the resistor 34. Thus, the readout of the quadrature discriminator 36 on a meter 40 is indicative of the deviation of the resonant frequency 30 from the frequency of the source 31 without substantial error which would be caused by the presence of a large inphase component on the input of the quadrature discriminator 36.

The above-described embodiments of the invention are simply illustrative of the principles of the invention and many

What is claimed is:

1. A circuit for determining deviation from desired resonance of a series LC network comprising:

a generator for producing a signal having the desired frequency of resonance;

means connected to the generator for applying the signal to the network and passing a current through the network to produce an intermediate voltage having inphase and quadrature components proportional to inphase and quadrature components of the impedance of the network;

a first phase-discriminating means connected to the generator and to the intermediate voltage producing means for producing a control voltage having a magnitude proportional to the magnitude of the inphase component of the intermediate voltage;

means connected to the generator and responsive to the control voltage from the first phase-discriminating means for cancelling a substantial portion of the inphase component of the intermediate voltage by adding an inverted inphase voltage to the intermediate voltage, the magnitude of the inverted inphase voltage being proportional to the magnitude of the control voltage; and a second phase-discriminating means connected to the generator and to the intermediate voltage producing means for producing an output voltage proportional to the quadrature component of the intermediate voltage.

2. A circuit as defined in claim 1, wherein:

the intermediate voltage producing means includes an amplifier with the network connected in a feedback circuit.

3. A circuit as defined in claim 2, wherein the cancelling means includes:

a radiant energy controlled resistance serially connected between the generator and the second phase-discriminating means; and a radiant energy emission device energized by the control voltage.

4. a circuit for determining deviation from desired resonance of a parallel LC network, comprising:

a generator for producing a signal having the desired frequency of resonance;

means having an input connected in series with the generator and the network for producing an intermediate voltage having inphase and quadrature components proportional to inphase and quadrature components of the current into the input thereof;

a first phase-discriminating means connected to the generator and to the intermediate voltage producing means for producing a control voltage having a magnitude proportional to the magnitude of the inphase component of the intermediate voltage;

means responsive to the control voltage from the first phase-discriminating means for cancelling a substantial portion of the inphase component of current into the input of the intermediate voltage producing means by applying an inverted inphase current to the input of the intermediate voltage producing means, the magnitude of the inverted inphase current being proportional to the magnitude of the control voltage; and a second phase-discriminating means connected to the generator and the intermediate voltage producing means for producing an output voltage proportional to the quadrature phase component of the intermediate voltage.

5. A circuit as defined in claim 4, wherein:

the intermediate voltage producing means includes a feedback amplifier and a transformer with a primary winding connected to the generator and with the parallel LC network connected serially with a secondary winding of the transformer and the input of the amplifier.

6. A circuit as defined in claim 5, wherein the cancelling means includes:

a radiant energy controlled resistance in series with an opposed secondary winding of the transformer and the input of the amplifier; and a radiant energy emission device controlled by the control voltage from the first phase-discriminating means.

* * * * *